3,426,268
PROCESS PARAMETER LEVEL SENSING DEVICE
Joseph J. Codichini, Kennett Square, Pa., assignor to Hewlett-Packard Company, Palo Alto, Calif., a corporation of California
Filed Jan. 3, 1967, Ser. No. 606,679
U.S. Cl. 323—100   7 Claims
Int. Cl. H02p *13/14*

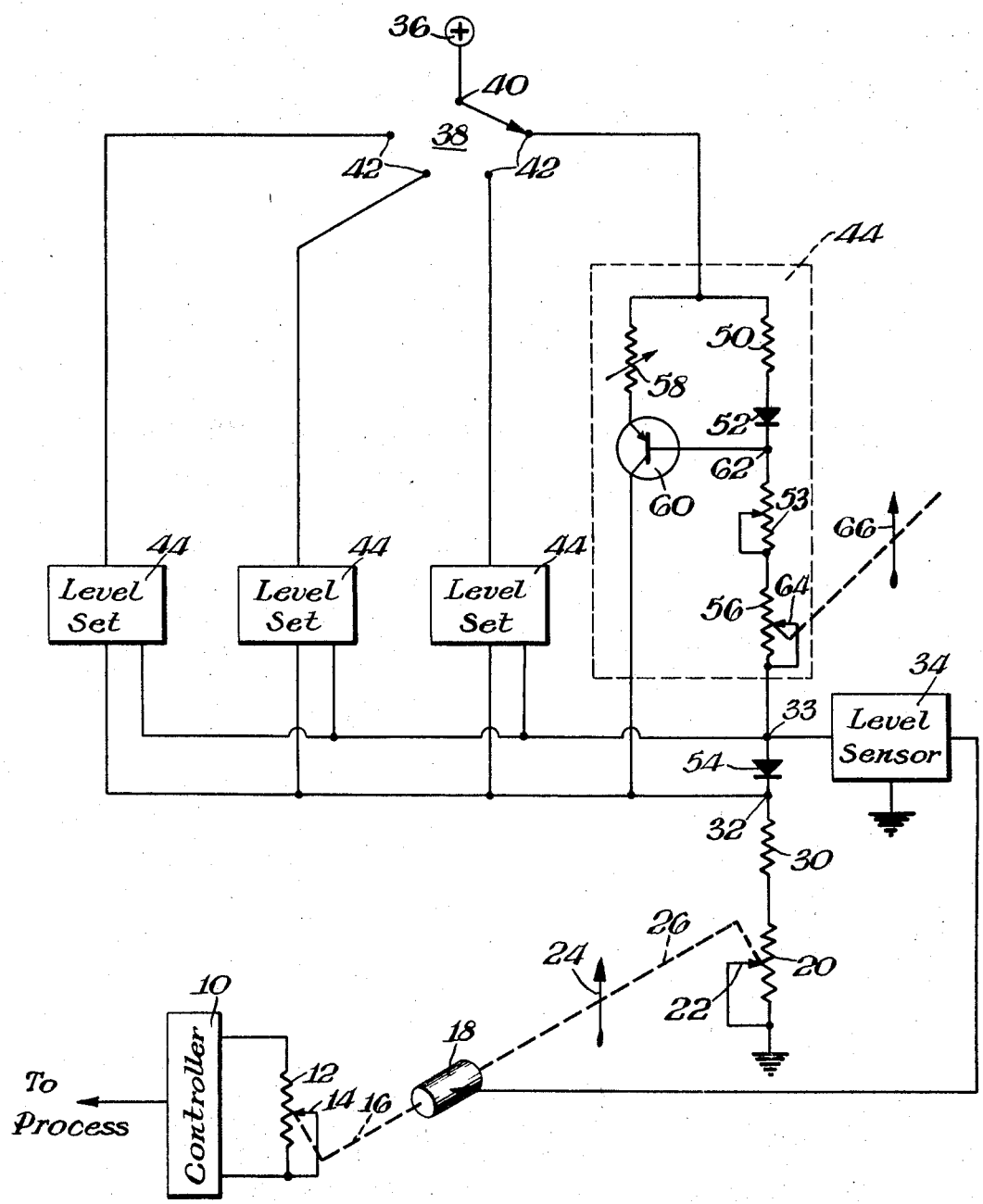

ABSTRACT OF THE DISCLOSURE

A process parameter level sensor includes (1) a second potentiometer ganged to the set point potentiometer of an automatic controller to denote the value of the process parameter and (2) a third potentiometer to sense when the pressure parameter has achieved a selected value. Differences in the resistance-displacement characteristics of the several potentiometers are compensated for by an adjustable constant current source which modifies the voltage developed across the second potentiometer by a constant factor related to such difference.

---

This invention relates to a level sensing device and, more particularly, relates to a device for determining accurately when a controlled process parameter has reached a predetermined level.

In the field of process control, it has been standard practice to provide an automatic controller which senses one of the process parameters which it is desired to control and compares that parameter to a set point. Depending upon the relationship between the process variable and the set point, the controller operates to automatically control the process such as by regulating a valve or damper disposed in a process line, applying more electrical energy to the heater of an oven, or the like in order to return the process variable back to its set point level.

The difference between the levels of the set point and the actual process variable is usually represented by an error signal which is impressed on the control unit to provide an output or control signal. As determined by the value of the control signal, the process controller acts on the process to restore the input signal representing the process variable to a value corresponding to that of the set point, i.e., the error signal is reduced to zero. For example, in the case of a valve, the position of a valve will be modified to the extent indicated by the control signal.

If the signal corresponding to the set point is varied as a function of time, the controlled process variable is correspondingly varied as the same function of time. This type of control action is referred to as programming. When programming a particular process variable, it is frequently desirable to ascertain when the set point has acquired a predetermined level so that the programming may be discontinued at that particular level.

The set point level may be established by means of a potentiometer. In such a case, the set point is linearly related to the angular rotation or displacement of the potentiometer. The value of the process variable established by the set point potentiometer may be determined by the use of a second potentiometer ganged to the set point potentiometer. The position or displacement of the second or level indicating potentiometer is a measure of the process variable set point. To sense when the set point potentiometer has achieved a particular value, the voltage developed across the level indicating potentiometer is compared to the voltage developed across a third or level set potentiometer. When the voltages developed across each potentiometer are related by a constant factor, a voltage level sensing device is then actuated. Although relatively simple in theory, unfortunately the resistance-displacement characteristics can vary appreciably between potentiometers. For example, variations in the resistance-displacement characteristics of potentiometers can vary as much as ±3% from their nominal or rate values. This means there can exist a difference in resistance values of any two potentiometers, having the same angular displacement, as great as 6%. If the potentiometers were controlling the temperature of an oven between 0 and 500° C., there could be temperature errors as great as 30° C. Such errors are intolerable in most control systems.

It is therefore an object of this invention to obviate many of the disadvantages of the prior art level sensors.

Another object of this invention is to provide an improved apparatus for relating the displacements of two transducers.

Still another object of this invention is to provide an improved means of compensating for differences in the resistance-displacement characteristics of level sensing potentiometers.

In accordance with a preferred embodiment of this invention, the value of a process parameter represented by the set point potentiometer of a controller is sensed. Sensing is accomplished by a source of potential, a second potentiometer ganged to the set point potentiometer, a third potentiometer connected in series with the second potentiometer and the series combination is connected across the source of potential. A constant current source is connected to the junction point between the second and third potentiometers and is responsive to a first current flowing to the third potentiometer for passing a compensating current related to the first current by a factor. A voltage sensing means generates an output signal when the voltage drop across the second potentiometer exceeds a predetermined amplitude level. By adjusting the constant current factor, the voltage sensing means will generate the output signal at that precise point when the value of the process parameter, as represented by the set point potentiometer, equals a predetermined value represented by the third potentiometer. The effects of variations in the displacement-resistance characteristics between potentiometers are obviated.

The novel features that are considered characteristic of this invention are set forth with particularity in the appended claims. The invention itself, however, both as to its organization and method of operation, as well as additional objects and advantages thereof, will be best understood from the following description when read in connection with accompanying drawing in which the sole figure is a partial block and partial schematic diagram of a temperature level sensing circuit constructed in accordance with a preferred embodiment of this invention which circuit compensates for the effects of non-linearities in the resistance-displacement characteristics of the several potentiometer transducers.

In the drawing there is seen a controller 10 which acts in a conventional manner to provide an output control signal for varying one of the process parameters or variables, such as temperature, flow rate, position, etc., through a servo system (not shown). The controller 10 varies the process parameter in accordance with a set point potentiometer 12. If, for example, the temperature of the process is to be varied, the controller 10 operates to maintain the temperature at some value as determined by the angular displacement of the potentiometer 12, or more precisely the angular displacement of the potentiometer rotor 14 along the resistance element of the potentiometer 12. By positioning the rotor by a motor 18 acting through a mechanical linkage denoted by the dashed line 16, the temperature of the process may be controlled in a linear manner as a function of time. By varying the speed of the motor 18 the rate of temperature increases or decreases may be precisely controlled. The system thus far described is conventional.

It is conventional also to sense or determine the temperature level established by the set point potentiometer 12. This is done by a transducer such as an indicating potentiometer 20 having a rotor 22 ganged by a second mechanical linkage, denoted by the dashed line 26, to the rotor 14 of the set point potentiometer 12. The two rotors 14, 22 thus move in unison. A suitable indicator illustrated by the arrow 24 may indicate visually the particular angular position of the two rotors 14, 22. The indicator 24, by way of example, may be a "Duodial" temperature indicating element which is available from Beckman Instruments Co., Fullerton, Calif., and other manufacturers. The indicating potentiometer 20 is connected in series with a first current limiting resistor 30 between a point of reference potential such as ground and a first junction point 32. This first junction point 32 is connected through the cathode side of a temperature compensating diode 54 to the input of a level sensor circuit 34. The level sensor 34 provides an output control signal when the voltage level at its input (second junction point 33) reaches a desired trigger level. In this instance, the level sensor 34 monitors the voltage across the series combination of the first current limiting resistor 30, the indicating potentiometer 20 and the diode 54. The level sensor circuit may be a Schmitt trigger. Other conventional voltage level sensing circuits may be employed as desired.

The output of the level sensor 34 is connected to the motor 18 and operates to disconnect power from the motor as soon as the predetermined temperature level is achieved. This permits the process controlled by the controller 10 to be programmed up in temperature until some desired level is established, after which the programming motor 18 is shut off as will be described hereinafter.

The voltage at the first junction point 32 is established by current flowing from a source of potential, denoted by the positive terminal 36. This potential is selectively applied through a four position switch 38 having a common terminal 40 and four switched terminals 42. Connected between each of the switched terminals 42 and the second junction point 33 is a level set circuit denoted by the blocks 44. The details of only one of the level set circuits 44 is shown. Additionally, although only four level set circuits are illustrated, as many as are desired may be employed.

Each level set circuit 44 has two parallel branches, the first being connected between the switched terminal 42 and the second junction point 33, the second being connected between the switched terminal 42 and the first junction point 32. The first parallel branch includes a current limiting resistor 50 connected in series with a second temperature compensating diode 52, an adjustable current limiting resistor 53, and a temperature level adjusting potentiometer 56. The second parallel branch provides a constant current source for the first junction point 32 and includes an adjustable factor control resistor 58 which forms part of the emitter-collector circuit of a PNP transistor 60. The base electrode of the transistor 60 is connected to a third junction point 62 between the adjustable resistor 53 and the cathode of the diode 52. The temeprature level potentiometer 56 has a rotor 64 to which is connected an indicating device denoted by the arrow 66 which may be similar to the indicating device 24.

As the set point potentiometer 12 is driven by the programming motor 18 to increase the temperature of the process, at a rate determined by the speed motor, the ganged temperature level indicating potentiometer 20 is also repositioned. Since the set point is linearly related to the angular displacement of the set point potentiometer 12, the displacement of the indicating potentiometer 20 also is a measure of process temperature. Furthermore, the voltage developed across the indicating potentiometer 20 is compared to the voltage developed across the temperature level set potentiometer 56 and its related current limiting desistors 50 and 53. The level sensor 34 is adjusted to fire at some fraction of the voltage from the source of potential 36. This fraction is established by the temperature level set potentiometer 56 which is adjusted to the temperature value at which it is desired to stop temperature programming and operate under some other program mode.

As the motor 18 drives the rotor 22 of the level indicating potentiometer 20, the voltage at the second junction point 33 gradually increases until the firing voltage of the level sensor 34 is attained. At this point, the level sensor 34 fires and the operation of the motor 18 discontinues. If the resistance-displacement characteristics of the indicating and level set potentiometers 20 and 56, respectively, are the same, both indicators 24 and 66 show the same temperature. If the characteristics are different, they will not read the same temperature. In some process control systems, the switch 38 would be an automatic stepping switch and would step to the next contact so that on a subsequent programmed operation a new and higher temperature level might be established.

In accordance with this invention, the effects of differences in the resistance-displacement characteristic of the potentiometers 20 and 56 are obviated by utilizing a constant current source (transistor 60) to feed some specific fraction of the current flowing through the level set potentiometer 56 to the first junction point 32. This additional current passes through the indicating potentiometer 20 and raises the voltage at the second junction point 33. The particular fraction of constant current supplied is a function of the ratio between the current limiting resistor 50 and the adjustable resistor 58. By appropriate adjustment of the adjustable resistor 58, the value of the constant current may be adjusted such that when the level sensor 34 fires, both the level set and indicating potentiometers indicators 66 and 24, respectively, will indicate the same temperature.

The adjustable resistor 53 facilitates adjustment such that the combined resistance values of the resistors 50 and 53 will bear a predetermined ratio to the resistor 30. This predetermined ratio is established by the ratio of the level set potentiometer 56 to the level indicating potentiometer 20. The diode 52 compensates for the effects of temperature variations in the emitter-base junction of the constant current transistor 60 and the second diode 54 is included to compensate for the effects of adding the first diode 52 to the circuit.

With the constant current source, each temperature level set circuit 42 as seen in the drawing, can be provided with their appropriate constant current adjustment such that each level set potentiometer can be adjusted to trigger the level sensor circuit 34 at the precise desired level even though the resistance-displacement characteristics of the several potentiometers differ appreciably.

It is obvious that many embodiments may be made of this inventive concept, and that many modifications may be made in the embodiments hereinbefore described. Therefore, it is to be understood that all descriptive matter herein is to be interpreted merely as illustrative, exemplary, and not in a limiting sense. It is intended that various modifications which might readily suggest themselves to those skilled in the art be covered by the following claims, as far as the prior art permits.

What is claimed is:

1. In a process control system having a controller for varying a process parameter in accordance with a predetermined program, said program being determined in accordance with the displacement of a driven set point potentiometer along its resistance-displacement characteristic, apparatus for sensing when said set point potentiometer has achieved a desired displacement comprising:

a source of potential, a second potentiometer ganged to be positioned with said set point potentiometer, a third potentiometer serially connected with said second potentiometer across said source of potential, a constant current generating means connected to the junction point between said second and third potentiometers and responsive to a first current flowing through said third potentiometer for generating a current related by a factor to said first current, and voltage sensing circuit means for generating an output signal when the voltage drop across said second potentiometer exceeds a predetermined amplitude level, thereby to denote the attainment by said set point potentiometer of said desired displacement.

2. The apparatus in accordance with claim 1 which also includes adjusting means connected to said generating means for varying said factor.

3. The apparatus in accordance with claim 2 wherein each of said second and third potentiometers have indicating means for visually indicating their respective displacements.

4. The apparatus in accordance with claim 2 which also includes a current limiting resistor connected between said third potentiometer and said source of potential.

5. The apparatus in accordance with claim 4 wherein said constant current generating means includes a transistor having a base electrode connected to the junction between said third potentiometer and said current limiting resistor, and a collector-emitter circuit connected in parallel with said series connected third potentiometer and current limiting resistor, thereby to introduce a constant current to the junction between said potentiometers.

6. The apparatus in accordance with claim 5 which also includes an adjustable resistor connected in series with said emitter-collector circuit, thereby to vary said factor as a function of the ratio of said current limiting resistor to said adjustable resistor.

7. The apparatus in accordance with claim 4 which also includes a plurality of said third potentiometers, a corresponding constant current generating means for each of said third potentiometers, and a multiposition switch for selectively connecting different ones of said third potentiometers and corresponding constant current generating means between said source of potential and said second potentiometer.

References Cited

UNITED STATES PATENTS

| | | | |
|---|---|---|---|
| 2,830,245 | 4/1958 | Davis et al. | 318—28 |
| 3,214,660 | 10/1965 | Smoot | 318—28 |
| 3,351,280 | 11/1967 | Harris | 236—46 |

JOHN F. COUCH, *Primary Examiner.*

G. GOLDBERG, *Assistant Examiner.*

U.S. Cl. X.R.

318—18